United States Patent [19]

Chardon

[11] 4,291,916

[45] Sep. 29, 1981

[54] SEAT FOR BUS, TRAIN OR AIRPLANE

[76] Inventor: Max M. F. Chardon, Saint-Prim, France

[21] Appl. No.: 179,827

[22] Filed: Aug. 20, 1980

Related U.S. Application Data

[63] Continuation of Ser. No. 28,816, Apr. 10, 1979, abandoned.

[30] Foreign Application Priority Data

Nov. 13, 1978 [FR] France .................. 78 32693

[51] Int. Cl.³ .......................................... A47C 1/025
[52] U.S. Cl. ..................................... 297/367; 297/355
[58] Field of Search ............. 297/384, 354, 355, 361, 297/367–369, 243

[56] References Cited

U.S. PATENT DOCUMENTS

| | | | |
|---|---|---|---|
| 2,177,408 | 10/1939 | Haslup | 297/369 |
| 2,283,485 | 5/1942 | Beck | 297/369 X |
| 3,037,812 | 6/1962 | Monroe | 297/355 |
| 3,272,555 | 9/1966 | Barecki et al. | 297/369 |
| 3,495,871 | 2/1970 | Resag et al. | 297/284 |
| 4,159,847 | 7/1979 | Arai | 297/369 X |

FOREIGN PATENT DOCUMENTS

| | | | |
|---|---|---|---|
| 2642091 | 3/1978 | Fed. Rep. of Germany | 297/354 |
| 636325 | 3/1962 | Italy | 297/361 |
| 328941 | 3/1958 | Switzerland | 297/369 |

Primary Examiner—William E. Lyddane
Attorney, Agent, or Firm—Karl F. Ross

[57] ABSTRACT

A seat usable in an airplane, train, or bus has a generally horizontal seat part having an upper surface and a rear edge and an upright back part extending upwardly from this rear edge and having a lower edge at the rear edge. A pivot is provided between the back part and the seat part and defines a horizontal pivot axis generally parallel to the edges but substantially above the upper surface of the seat part. In addition this axis is at least as high as the level of the knees of a person sitting behind the seat in another such seat mounted on the same floor level. It is possible to lock the back part relative to the seat part in any of a plurality of anuglarly offset positions.

7 Claims, 6 Drawing Figures

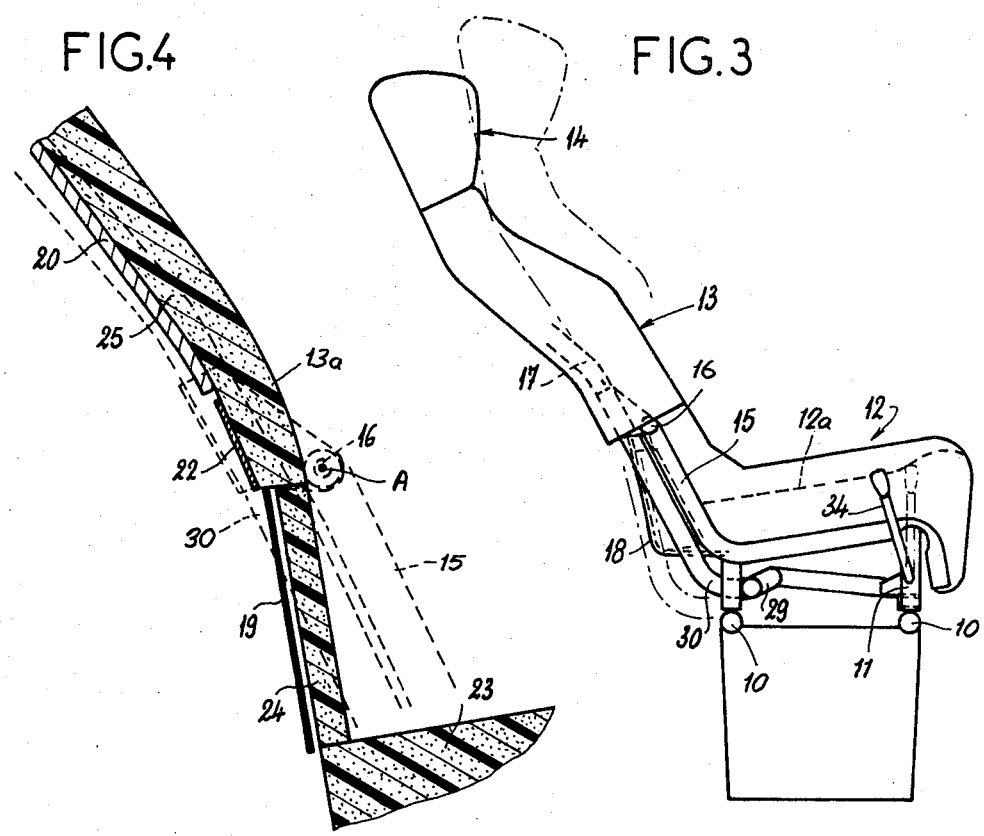
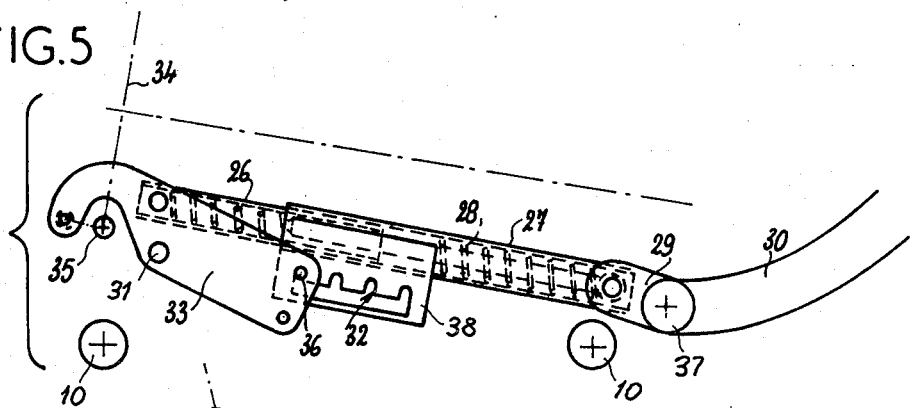
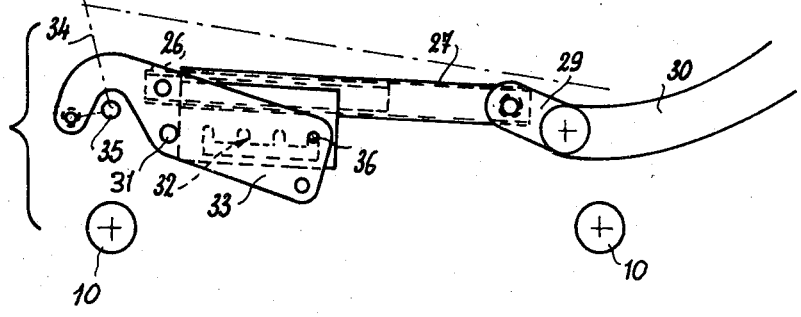

SEAT FOR BUS, TRAIN OR AIRPLANE

This is a continuation of application Ser. No. 28,816, filed Apr. 10, 1979, now abandoned.

FIELD OF THE INVENTION

The present invention relates to a seat. More particularly this invention concerns a seat which is normally used with a plurality of other such seats in a mass-transit vehicle such as an airplane, train, or bus.

BACKGROUND OF THE INVENTION

An airplane, train, or bus normally has a multiplicity of seats arranged in rows one behind the other. Such seats must provide safe and comfortable sitting places for the passengers. At the same time the seats must be constructed so that the maximum number of passengers can be fitted into the smallest possible space. Normally the law requires that the seats be spaced apart front-to-back by at least 70 centimeters, that is that the distance between a predetermined part of a seat be at least 70 centimeters in front of or behind the same part of the seat in the front or behind it.

Such a seat normally has a limited capacity to tip back so that a passenger need not sit perfectly upright at all times and can rest or sleep. Obviously this tipping-back greatly complicates the space problem, in particular due to the restrictions applied by various regulations.

It is therefore normal to pivot the back part of the seat on the seat part about a horizontal axis extending underneath the lower edge of the back part and at a location normally well below the sitting surface of the seat. The problem with this type of arrangement is that when the back part is tipped back it reduces the space between it and the front of the seat behind it. Thus when a seat is tipped back it can come to lie against the knees of the passenger in the seat behind it, making this passenger uncomfortable and, in fact, infringing upon the space this passenger expects to be able to use. Furthermore when the passenger behind a seat that has been tipped back chooses to tip back his or her seat, the normal result is that this passenger's knees will be moved somewhat forwardly, thereby greatly increasing the extent to which the space between seats is cramped.

Obviously the solution to this problem is to provide the seats at a greater spacing front-to-back. Even when the spacing is only increased by a relatively small distance of, say, 5 to 6 centimeters the result is that a railroad car, airplane, or bus provided with a dozen or more such rows of seats will have one row less, thereby losing valuable revenue.

OBJECTS OF THE INVENTION

It is therefore an object of the present invention to provide an improved seat.

Another object is to provide such a seat which is particularly usable in a mass-transit vehicle such as a bus, train, or airplane, but which is nonetheless usable in other environments, such as in a concert hall or movie theater.

A further object is to provide a seat which can be tipped back, yet which will not cramp the passenger behind it in the manner described above.

SUMMARY OF THE INVENTION

These objects are attained according to the instant invention in a seat wherein the pivot between the back part and the seat part defines a horizontal pivot axis which is above the upper sitting surface of the seat part and in fact is at least as high as the level of the knees of the person sitting behind the seat in another such seat at substantially the same level. Thus in effect that part of the seat which tips back is the part above the kidneys of the person sitting in it, and above the knees of the person sitting behind it so that although the seat can tip back to provide a completely comfortable resting place for its occupant, this tipping-back will not move the seat back onto the knees of the person sitting behind it.

According to further features of this invention the seat part has a rigid frame having a pair of tubular frame elements that extend upwardly to and define the pivot axis. This seat frame is provided below the pivot axis on each of these tubular frame elements with a right-triangular plate whose hypotenuse lies along the respective tubular member, but whose two sides are behind it. Secured between the upright sides of these plates is a rigid seat plate to which is secured a lower back cushion.

The back part also has a rigid frame spanned at its upper end by a rigid upper plate and at its lower region by a lower plate, the latter being supported much more firmly than the former. Thus the occupant of such a seat is provided with a relatively firm and comfortable back, the upper portion of which can pivot backwardly to provide this occupant with a relatively comfortable place to rest.

In accordance with another feature of this invention means is provided for locking the back part at any of a plurality of angularly offset positions relative to the seat part. This means allows the occupant of such seat to set it at an angle suited best to his or her comfort.

According to further features of this invention the seat can be formed as a bucket seat, in which case the pivot axis is provided well in front of the rearmost point of the front surface of the back cushion at the level of this pivot. Such a seat can have sides that engage somewhat around the passenger to hold him or her firmly in place in complete comfort. In fact it has been found that such a seat, when provided at rows spaced front-to-back by 70 cm is as comfortable as the hitherto known seats spaced at between 75 and 76 cm.

BRIEF DESCRIPTION OF THE DRAWING

FIG. 3 is a large-scale view of a seat according to this invention in side view;

FIG. 4 is a large-scale vertical section through a detail of the seat of FIG. 3; and FIGS. 5 and 6 are details of the mechanism of the seat of FIG. 3 in two opposite end positions.

SPECIFIC DESCRIPTION

Figure 1:
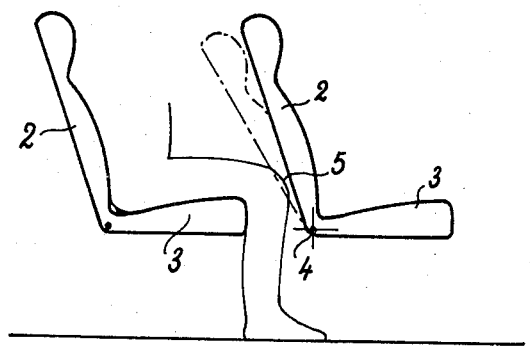
FIG. 1 is a largely schematic view showing standard prior-art seats.

As shown in FIG. 1 a prior-art seat normally has an upright back part 2 secured to a generally horizontal seat part 3 at a horizontal pivot 4 extending at the lower edge of the back part 2 and well below the upper surface of the seat part 3. Thus when such a back part 2 is tipped back it will come into engagement with the knees 5 of a passenger sitting in another such seat arranged behind. Thus unless the person sitting in the seat behind one is relatively small, it is usually impossible to tip one's seat back very far.

Figure 2:
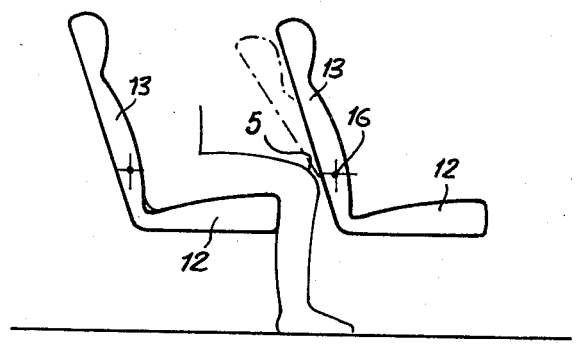
FIG. 2 is a view similar to FIG. 1 showing the seats according to this invention.

According to the instant invention as shown in FIG. 2 a seat has a generally horizontal seat part 12 and an upright back part 13 secured together at a pivot 16 which lies well above the upper surface 12a of the seat part 12 and at or somewhat above the level of the knees 5 of a passenger sitting in another such seat immediately behind the seat. Thus when tipped back as shown in dot-dash lines in FIG. 2 the back part 13 will not come into engagement with the knees 5 of the passenger in the seat behind it.

As shown in more detail in FIGS. 3 and 4 the back part 13 has a head rest 14 of conventional design. The seat part 12 has a tubular metal frame 15 that is secured in conventional fashion via legs 11 to supports 10 constituting a pair of parallel horizontal bars normally supporting a row of such seats. The tubular seat frame 15 extends upwardly beyond the upper surface 12a of the seat part 12 and forms at its upper end the pivot 16. In addition this frame 15 is provided with a pair of right-triangular plates 18 spaced apart relative to the pivot axis A defined by the pivot 16. The hypotenuse of each of these right-triangular plates 18 is welded to a respective tubular element of the frame 15 and a plate 19 is resiliently mounted between the rear edges of the two plates 18.

The back part 13 has a tubular frame 17 provided with a pair of downwardly extending elements 30. This back frame 17 is fixed to a plywood upper board 20 and to a thinner lower board 22. The lower board 22 is mounted much more rigidly to the frame 17 than the upper board 20 so as to have less give in a front-to-back direction. Similarly the plate 19 is resiliently but firmly mounted on the upper extensions of the frame 15.

A seat cushion 23 defines the sitting surface 12a of the seat 12 and a lower back cushion 24 defines the portion of the back 13 below the pivot 16. Above the pivot 16 a cushion 25, formed like the cushions 23 and 24 of a block of closed-cell foam, is secured to the boards 20 and 22. The cushion 25 is substantially thicker than the cushion 24 so as further to maximize the knee room for a passenger sitting behind the seat according to this invention.

The seat is formed as a bucket seat according to this invention having side flanges or portions that extend upwardly beyond the surface 12a of the seat 12 and forwardly beyond the surface 13a of the back 13. The pivot axis A is forward of the surface 13a also.

As shown in FIGS. 5 and 6 mechanism is provided to allow the back part 13 to be pivoted about the axis A and lock it in any of four positions. To this end the extensions 30 are connected together by means of a tube 37 and each has an extension end 29 pivoted to an outer tube 27 in which slides an inner tube 26. A spring 28 compressed between tubes 26 and 27 normally urges the back part 30 into the upright position shown in dot-dash lines in FIG. 3.

A pair of hook plates 33 is pivoted at 31 on a fixed pivot parallel to the axis A and fixed relative to the support frame members 10. These hook plates 33 can be pivoted about the axles 31 by means of a lever 34. Each hook plate 33 acts as the support for the respective inner tube 26, and carries a ratchet or locking pin 36 engageable in a rack 32 formed in a respective plate 38 carried on each of the outer tubes 27. Thus when the control arm 34 is pivoted about its fixed pivot 35 it pivots the respective hook plates 33 to move the pins 36 out of engagement with the respective racks 32 so that the two tubes 26 and 27 can telescope relative to each other.

When thus actuated the seat back will, unless actively pressed backwardly, move under the force of the spring 28 into the upright position. If it is in the upright position and the lever 34 is actuated the occupant of the seat need merely lean backwardly against the back part 13 to pivot it back into the desired position, whereupon the lever 34 can be released to lock the seat in the respective one of the four positions. If the seat is in the back position the lever 34 can be actuated and the occupant need merely sit forward so that the back part 13 will spring forwardly into the upright position. When locked in place the back part 30 is extremely rigidly held so that even in the event of a collision flopping-over of the back part 30 is virtually impossible.

Thus the seat according to the instant invention takes up a minimum amount of space in a front-to-back direction, yet provides a comfortable reclining seat for its occupant. It has been found that providing the pivot at a relatively high location above the sitting surface 12a of the seat part 12 in no way makes the seat less comfortable when reclined backwardly, as in fact the passenger normally shifts somewhat forwardly on the seat 12 in any case. What is more reducing the thickness of the cushion 24 has also been found to reduce the comfort of the seat in no way, as little support is required in this low lumbar region.

I claim:
1. A seat comprising:
   a seat frame having a rearward and upward extension having an upper end defining a horizontal pivot axis;
   a generally horizontal seat part supported on said seat frame and lying wholly below said axis and a rear edge;
   a back frame pivoted on said seat frame at said axis and having a downward extension projecting downwardly below said axis and having a lower end underneath said seat part;
   an upright back part having an upright lower back cushion supported on said extension of said seat frame below said axis and an upright upper back cushion supported on said back frame above said axis, said cushions defining a front surface lying at its rearmost point behind said pivot axis; and
   means underneath said seat part and engaged between said lower end of said back frame and said seat frame for locking said back part with said upper cushion in any of a plurality of angularly offset positions about said axis relative to said seat part and said lower cushion.

2. The seat defined in claim 1 wherein said lower cushion is substantially thinner from front to back than said upper cushion.

3. The seat defined in claim 1 wherein said means includes a pair of telescoping members, one of which is connected to said lower end of said back frame and the other of which is connected to said seat frame, and means for relatively locking said members together.

4. The seat defined in claim 3, further comprising a spring between said members for urging said members apart and said back part forwardly.

5. The seat defined in claim 4 wherein said one member carries a plate having a plurality of notches, said means further comprising means connected to said other member including a formation fittable into said notches.

6. The seat defined in claim 5 wherein said formation is a rod pivotal relative to said seat frame.

7. The seat defined in claim 5 wherein said means includes a hook plate pivoted on said seat frame, said other member being pivoted on said hook plate and said hook plate carrying said formation.

* * * * *